(12) United States Patent
Konno et al.

(10) Patent No.: US 7,097,819 B2
(45) Date of Patent: Aug. 29, 2006

(54) METHOD FOR PRODUCING CALCIUM CARBONATE

(75) Inventors: Haruo Konno, Yamaguchi (JP); Yasunori Nanri, Yamaguchi (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 298 days.

(21) Appl. No.: 10/181,397

(22) PCT Filed: Jan. 17, 2001

(86) PCT No.: PCT/JP01/00269

§ 371 (c)(1),
(2), (4) Date: Jul. 16, 2002

(87) PCT Pub. No.: WO01/53203

PCT Pub. Date: Jul. 26, 2001

(65) Prior Publication Data

US 2003/0049194 A1    Mar. 13, 2003

(30) Foreign Application Priority Data

Jan. 18, 2000    (JP) .............................. 2000-008953

(51) Int. Cl.
C01F 11/18 (2006.01)

(52) U.S. Cl. ....................... 423/431; 423/430; 423/432

(58) Field of Classification Search ................ 423/432, 423/430, 431
See application file for complete search history.

(56) References Cited

U.S. PATENT DOCUMENTS

| | | | |
|---|---|---|---|
| 2,211,908 A | 8/1940 | O'Connor | |
| 3,268,387 A | 8/1966 | Casciani et al. | |
| 3,268,388 A | 8/1966 | Bauman et al. | |
| 3,627,480 A | 12/1971 | Birchall | |
| 4,244,933 A | 1/1981 | Shibazaki et al. | |
| 4,668,342 A | 5/1987 | Blackwell | |
| 4,894,217 A | 1/1990 | Ostman | |
| 5,741,471 A | 4/1998 | Deutsch et al. | |
| 6,190,633 B1 * | 2/2001 | Takahashi et al. | .......... 423/432 |
| 6,627,170 B1 * | 9/2003 | Takahashi et al. | .......... 423/432 |

FOREIGN PATENT DOCUMENTS

| | | |
|---|---|---|
| EP | 949201 | 10/1999 |
| EP | 953544 | 11/1999 |
| GB | 2145074 | 3/1985 |
| JP | 58-36924 | 3/1983 |
| JP | A 61-053112 | 3/1986 |
| JP | 63-256514 | 10/1988 |
| JP | 1-226719 | 9/1989 |
| JP | 4-29606 | 5/1992 |
| JP | 4-224110 | 8/1992 |
| JP | 9-217292 | 8/1997 |
| JP | 11-189990 | 7/1999 |
| WO | WO 79/00931 | 11/1979 |
| WO | WO 98/25852 | 6/1998 |

\* cited by examiner

Primary Examiner—Stuart Hendrickson
(74) Attorney, Agent, or Firm—Nixon & Vanderhye P.C.

(57) ABSTRACT

Calcium carbonate in the form of aragonite crystals suitable for use as a filler for papermaking to give useful properties for bulk, whiteness, opacity, wire abrasion and yield is obtained by taking advantage of the causticization step. Herein disclosed is a process for producing calcium carbonate in the form of aragonite crystals which is useful as a filler for papermaking via the causticization step of the sulfate or soda pulping process, comprising adding an aqueous alkaline solution having a hydroxide ion level of 3 mol/l or less and containing 0.25 mol or less of carbonate ion per 1 mol of quick lime to quick lime and/or slaked lime at a quick lime concentration of 1–60% by weight with stirring to prepare milk of lime, and then adding green liquor to said milk of liquor at a loading rate of 0.002–0.12 g (sodium carbonate)/min/g (quick lime) to perform a causticization reaction at a temperature of 30–105° C.

3 Claims, 4 Drawing Sheets

METHOD FOR PRODUCING CALCIUM CARBONATE

This application is the US national phase of international application PCT/JP01/00269 filed 17 Jan. 2001 which designated the U.S.

FIELD OF THE INVENTION

The present invention relates to processes for producing calcium carbonate in the form of aragonite crystals giving useful performance as a filler for papermaking and a coating pigment for papermaking via a causticization step of the sulfate or soda pulping process, and more specifically processes for producing calcium carbonate in the form of aragonite crystals giving useful performance as a filler for papermaking by using an aqueous alkaline solution for suspending quick lime or/and slaked lime.

PRIOR ART

Normally, printing or writing paper contains a filler for the purpose of improving whiteness, opacity, smoothness, writing suitability, touch, printability or other properties. These papers include so-called acid paper made at about pH 4.5 using talc, clay, titanium oxide or the like as a filler and so-called neutral paper made at a neutral to weakly alkaline pH range of 7.0–8.5. In neutral paper, domestic calcium carbonate can be used as a filler in place of expensive imported talc or clay. Recently, neutral paper has attracted attention because of its longevity or other reasons, and the change to neutral paper is advancing and will prevail because of its further many advantages in paper quality, costs, environmental protection or the like.

A feature of recent demands for paper is a significant growth in the field of leaflets, catalogs, pamphlets, direct mails or the like in commercial printing and in the field of computer-, multimedia- and family computer-related books reflecting the popularization of information technology, magazines, comics or the like in publishing, which urges paper users to seek low-cost, low-grade and light-weight paper.

Under growing demands for inexpensive and light-weight neutral paper as described above, the position of calcium carbonate as a filler is very important. Calcium carbonate used as a filler in such neutral paper includes heavy calcium carbonate obtained by mechanically dry- or wet-grinding natural limestone and precipitated calcium carbonate which is chemically synthesized (synthetic calcium carbonate).

However, heavy calcium carbonate obtained by grinding natural limestone by a mill such as a ball mill severely wears a plastic wire during papermaking when it is used as filler. Moreover, normal fine-quality papers or coated papers made with such filler are insufficient in bulk, opacity, smoothness, writing suitability, touch, printability and other properties.

The above problem becomes more serious with recent advances in weight reduction. Conventional means for improving the opacity of light-weight printing papers were fillers having a large specific surface area (e.g. pulverized silica, white carbon) or a high refractive index (e.g. titanium dioxide). These fillers improved opacity, but did not have effective stiffness because they were unable to increase bulk (i.e. could not lower density). One possible means for increasing bulk is to increase the freeness of the pulp used, in which case the resulting paper has a high bulk and a low density but also shows a porous paper layer structure to lower air permeability and smoothness. If such a porous base paper having a low air permeability is coated with a pigment coating color, the coating color excessively penetrates the base paper to lower various printability properties such as base paper covering properties, surface smoothness after drying, gloss before printing and surface properties with even gloss.

In order to solve these problems, precipitated calcium carbonate has been used. Known preparation processes thereof include (1) the carbon dioxide process involving a reaction between milk of lime and carbon dioxide obtained from the calciner of limestone or the like, (2) the calcium chloride/soda process involving a reaction between sodium carbonate and calcium chloride, (3) the lime/soda process involving a reaction between sodium carbonate and milk of lime, etc. Among them, both processes (2) and (3) produce calcium carbonate as a by-product and are now abolished and replaced by alternative ways to their main products. Moreover, the applicability of the resulting calcium carbonate to paper has been less examined. On the other hand, process (1) has been widely investigated for techniques for preparing various shapes and some actual on-site production cases in paper mills have been shown. Especially, calcium carbonate in the form of acicular, columnar or radiating aragonite crystals are known to remarkably improve opacity and bulk when used in paper.

However, this process produces calcium carbonate as the sole product and therefore requires high production costs contrary to users' demands for cost reduction, and the resulting calcium carbonate is unsuitable or limited for use in inexpensive papers.

A possible alternative is to use, as a material for papermaking, the calcium carbonate generated as a by-product during the causticization step for recovering/regenerating the digesting agent in the kraft pulping process.

In the sulfate or soda pulping process, the wood is digested with a mixed chemical solution of sodium hydroxide and sodium sulfide at high temperature and high pressure to separatepulp as a solids phase. while the chemical solution and other components than pulp dissolved from the wood are recovered as waste pulping liquor (black liquor) and concentrated and burned. Then, the components dissolved from the wood are recovered as a heat source while inorganic matter in the black liquor is recovered as sodium carbonate and sodium sulfide and dissolved in water or a dilute liquor in which a portion of white liquor components are dissolved, and which is generated by washing the calcium carbonate sludge produced by the following:

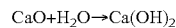

$$CaO+H_2O \rightarrow Ca(OH)_2$$

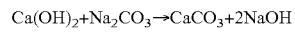

$$Ca(OH)_2+Na_2CO_3 \rightarrow CaCO_3+2NaOH$$

This calcium carbonate can be prepared at very low cost because it is a by-product generated in the process for preparing white liquor as a main product. Moreover, it can be expected to improve the kinetics of the above reactions (1) and (2) and the purification of white liquor and to reduce waste, because the removal of calcium carbonate from the calcium circulating cycle (calcium carbonate, quick lime, slaked lime) in an originally closed system of the causticization step allows the inside of the system to be cleaned and the circulating lime to be highly purified.

However, it was difficult to control the shape of calcium carbonate obtained by the reaction in the conventional process, and the crystal structure showed irregular or massive calcite crystals in cubic, hexagonal or various other shapes having a large particle size and rather resembled conventional heavy calcium carbonate. Thus, this calcium carbonate could not be used as filler to produce normal fine-quality papers or coated papers having sufficient bulk, whiteness, opacity, smoothness, writing suitability, touch, printability or other properties. Another serious problem was plastic wire abrasion under the recent trend toward large papermaking machines at high speed.

Thus, it was difficult to efficiently and inexpensively prepare calcium carbonate, especially in the form of aragonite crystals, as a filler or pigment which shows lower plastic wire abrasion during papermaking and which can be used in lower amounts to produce lighter papers having the same printing quality or at the same ash content to produce fine-quality papers or coated papers with high bulk and opacity and stiffness.

In view of the above situation, it is an object of the present invention to provide inexpensive calcium carbonate, especially in the form of aragonite crystals, which shows lower plastic wire abrasion during papermaking and which can be used to produce stiff and highly opaque fine-quality papers or coated papers having excellent printing qualities or other properties, by taking advantage of the causticization step.

SUMMARY OF THE INVENTION

We previously disclosed an invention on the basis of the finding that the above problems can be solved by taking advantage of the causticization step of the sulfate or soda pulping process to continuously add the green liquor from the causticization step of the sulfate or soda pulping process to the milk of lime obtained by slaking quick lime containing calcium carbonate at a specific level or less with a liquor having a pH of 5.5–13.5 at controlled loading rate and reaction temperature (JPA 226974/98). However, this process produces massive calcite crystals when a weak liquor having a pH of 13.5 or more is used for slaking quick lime. Moreover, it was difficult to obtain aragonite crystals at low concentrations of milk of lime or the loading period had to be prolonged to maintain a proper shape even at low concentrations of milk of lime within a defined range.

As a result of further careful studies, we accomplished the present invention on the basis of the finding that aragonite crystals can be obtained by taking advantage of the causticization step of the sulfate or soda pulping process to add an aqueous alkaline solution having a hydroxide ion level of 3 mol/l or less and containing 0.25 mol or less, preferably 0.1 mol or less of carbonate ion per 1 mol of quick lime to quick lime and/or slaked lime at a quick lime concentration of 1–60% by weight with stirring to prepare milk of lime and then continuously add green liquor at a controlled loading rate and reaction temperature. The pH of the aqueous alkaline solution containing carbonate ion here is preferably more than 13.5. The lower limit of the carbonate ion level in said aqueous alkaline solution is not defined because it is difficult to control such a level due to the variation with dissolution of carbon dioxide in the air into both aqueous alkaline solution and water. It was found that acicular, columnar and radiating calcium carbonates having a high content of aragonite crystals and a controlled shape of particles having a minor axis of 0.1–1.5 µm and a major axis of 0.3–15 µm can be prepared by processes of the present invention. They are excellent in whiteness, bulk and opacity as a filler for papermaking with lower wire abrasion. At the same time, they can be prepared at greatly lower cost as compared with calcium carbonate obtained by the conventional process involving the reaction between milk of lime and carbon dioxide. Additionally, the removal of calcium carbonate from the process shortens or even eliminates kiln operation at some doses of the causticized light calcium carbonate, thus saving the overall cost of the causticization step.

THE MOST PREFERRED EMBODIMENTS OF THE INVENTION

Figure 1:
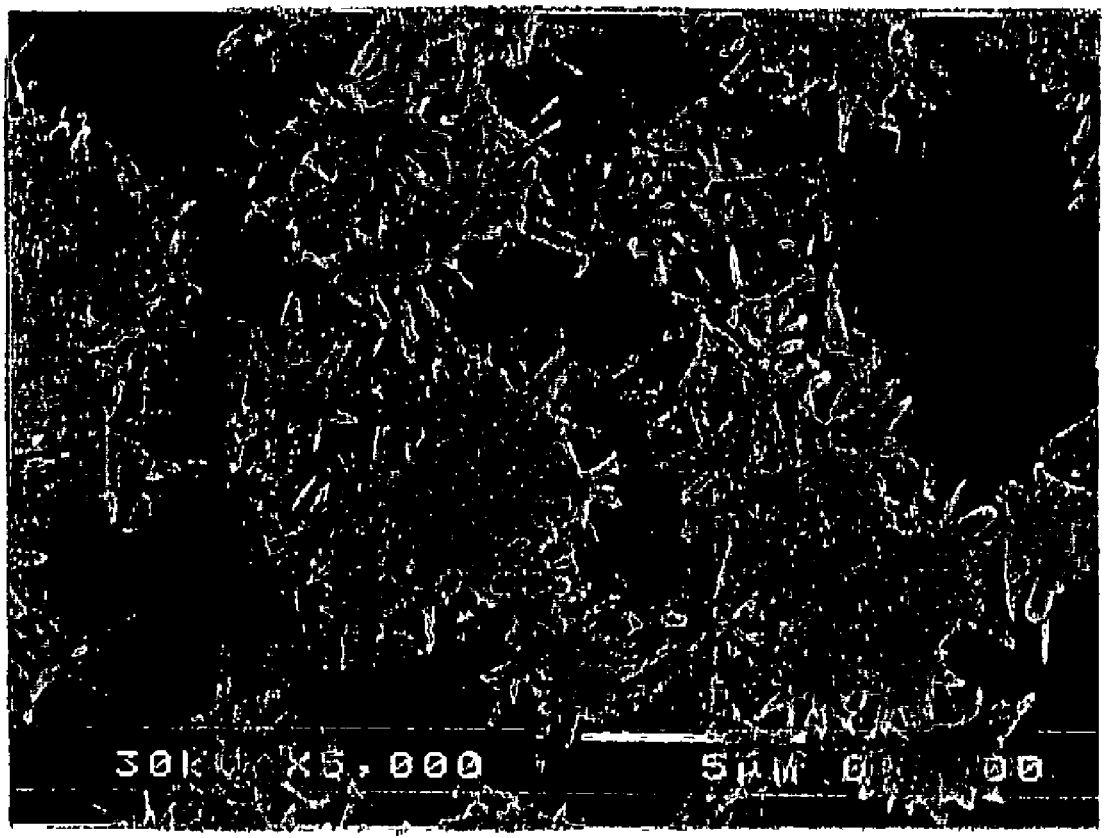
FIG. 1 is a scanning electron microphotograph showing the crystal structure of radiating calcium carbonate obtained in Example 1.
Figure 2:
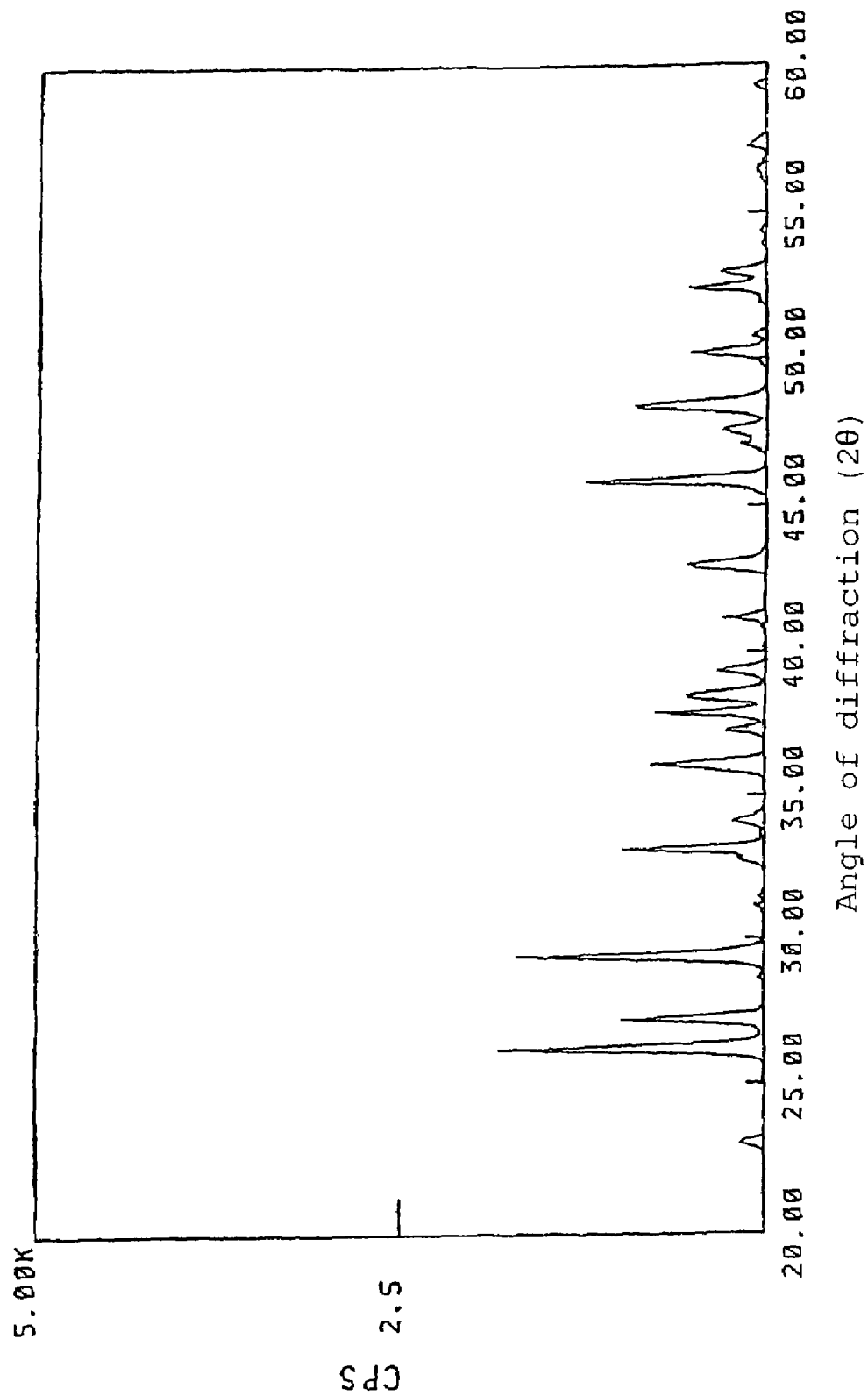
FIG. 2 shows the result of X-ray diffraction of the product obtained in Example 1.
Figure 3:
FIG. 3 is a scanning electron microphotograph showing the crystal structure of columnar calcium carbonate obtained in Example 2.
Figure 4:
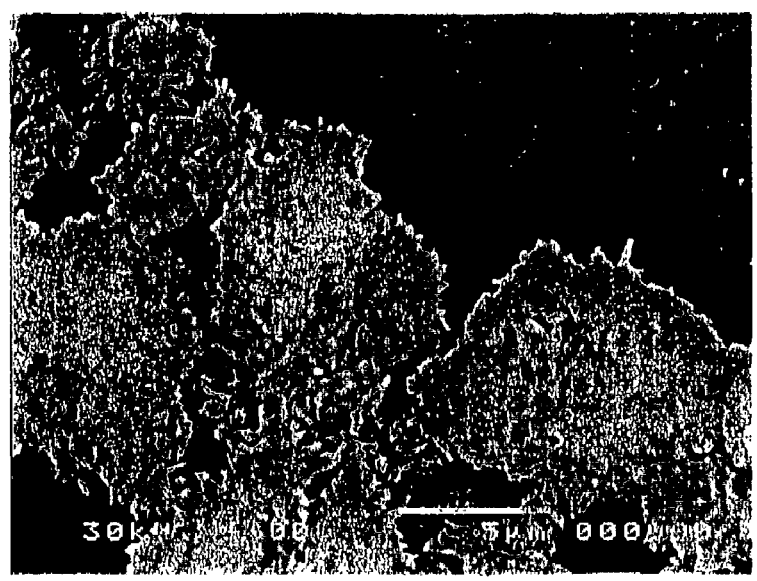
FIG. 4 is a scanning electron microphotograph showing the crystal structure of irregular calcium carbonate obtained in Comparative example 3.
Figure 5:
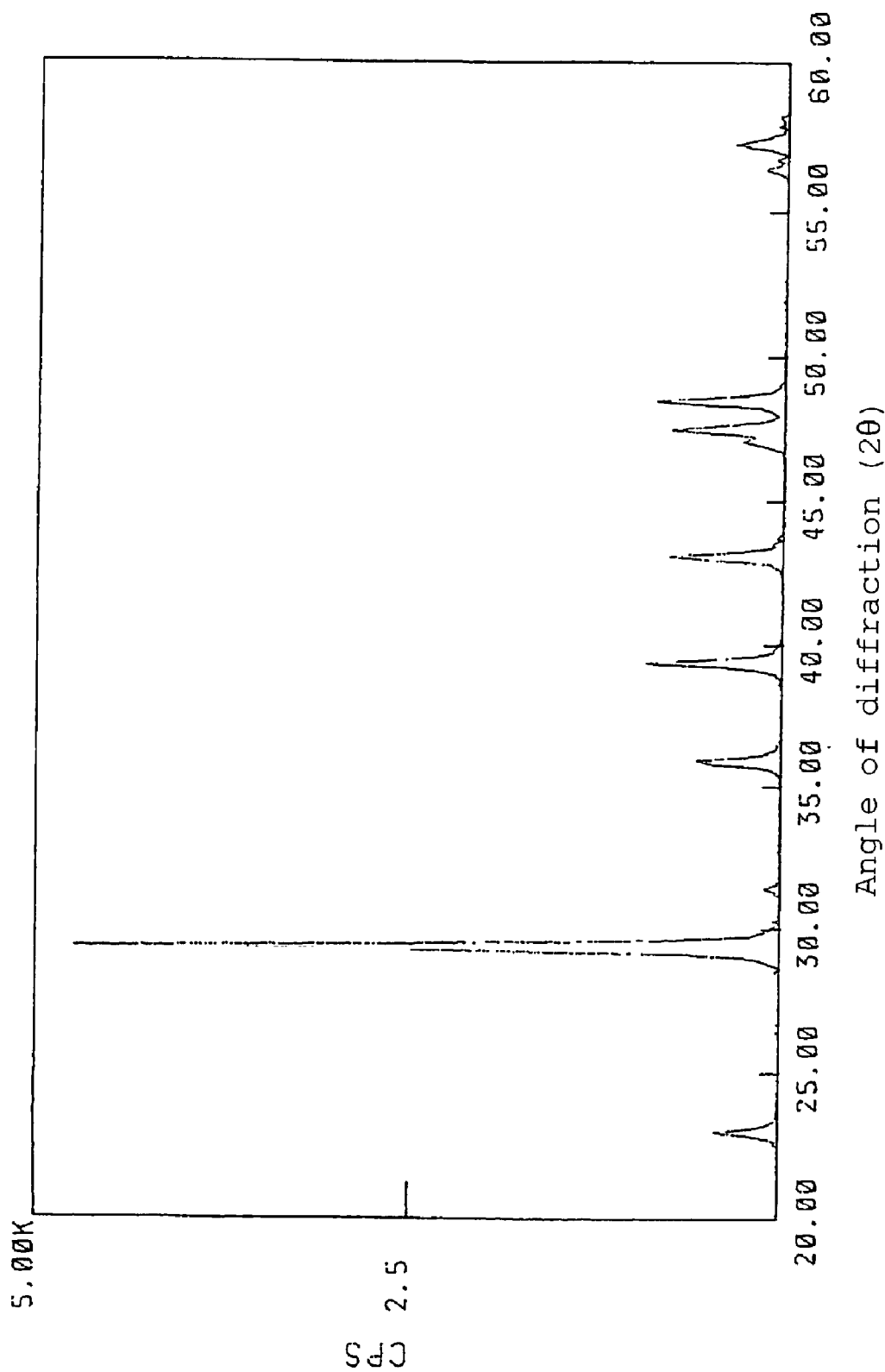
FIG. 5 shows the result of X-ray diffraction of the product obtained in Comparative example 3.

Quick lime used in the preparation of milk of lime according to the present invention may be obtained by calcining limestone essentially consisting of calcium carbonate or the calcium carbonate generated when sodium carbonate is converted into sodium hydroxide via the causitization step of the sulfate or soda pulping process. The calciner used here may be any apparatus for converting calcium carbonate into quick lime (calcium oxide) such as Beckenbach kiln, Meltz kiln, rotary kiln, Kunii kiln, KHD kiln, Top-shaped kiln, Calmatic kiln, fluidized bed calciner, vertical mixer/calciner.

As to levels of impurities in the resulting calcium carbonate, coloring element levels (Fe, Mn, etc.) are especially critical. However, they can be controlled by appropriately selecting the quick lime obtained from starting limestone having low coloring element levels according to the purpose of the product paper. In the case of the quick lime recalcined in a rotary kiln or fluidized bed calciner or the like via the causticization step, the amount of the starting limestone having low coloring element levels supplied to the calcium circulating cycle of the causticization step or the amount of the resulting quick lime after calcination can be varied appropriately because coloring element levels vary with the ratio between calcium carbonate removed from the system and calcium carbonate recirculating in the system or other factors.

Slaked lime used in the preparation of milk of lime may be obtained by wet- or dry-slaking said quick lime, but dry-slaked lime is preferred for the shape of the resulting calcium carbonate.

The solution to be added for the preparation of milk of lime can be an aqueous alkaline solution containing 0.25 mol or less, preferably 0.1 mol or less of carbonate ion per 1 mol of quick lime. If the aqueous alkaline solution containing carbonate ion used here has a hydroxide ion level exceeding 3 mol/l, it is costly and of no practical use due to the imbalance between Na and S in the white liquor produced in the kraft pulping process. Moreover, causticization reaction itself does not readily proceed. This aqueous alkaline solution may be any alkaline solution but suitably an aqueous dilution of white liquor produced during the causticization step or a weak liquor consisting of the supernatant of solutions cleared of precipitates of green liquor or white liquor (dregs, calcium carbonate sludge) in view of the fact that this is a process via the causticization step. When further high-quality calcium carbonate in the form of aragonite crystals is to be obtained, it is preferable to use an aqueous solution free from carbonate ion such as an aqueous sodium hydroxide solution. If more than 0.25 mol of carbonate ion is contained per 1 mol of quick lime in a solution using white liquor or weak liquor, the resulting calcium carbonate forms spindle-like or massive calcite crystals.

Milk of lime should be prepared at a quick lime concentration of 1–60% by weight. If the lime concentration exceeds 60% by weight, the viscosity of milk of lime becomes too high to practically agitate. If the lime concentration is lower than 1% by weight, however, productivity is low for practical use.

Mixing for slaking quick lime and suspending the slaked lime may be performed using a means appropriately selected from conventional extruders, kneaders and blenders equipped with agitating blades or a pump to suit the viscosity of the liquor or slurry during mixing (see Handbook of Chemical Engineering published by Maruzen, Mar. 18, 1988).

Green liquor used in the causticization reaction according to the present invention can be green liquor generated from the causticization step of the conventional sulfate or soda process. If further high-quality calcium carbonate is to be obtained, it is preferable to use sodium carbonate crystallized by cooling or heating green liquor to concentration and diluted or not in water or weak liquor. When solid sodium carbonate is used, it may be appropriately added. When an aqueous sodium carbonate solution is used, it should be used at an $Na_2CO_3$ concentration of 20–230 g/L (as $Na_2O$, the same basis as below), preferably 60–180 g/L, more preferably 80–120 g/L. If the $Na_2CO_3$ concentration is lower than 20 g/L, the final concentration of white liquor is lowered and should be modified before it is used for digestion. However, a solution having a concentration higher than 230 g/L cannot be prepared because the saturation concentration is approached.

Said milk of lime and green liquor should be mixed at a loading rate of 0.002–0.12 g sodium carbonate/min/g quick lime, preferably 0.002–0.04 g/min/g. If the loading rate is lower than 0.002 g sodium carbonate/min/g, productivity is low for practical use. If the loading rate is higher than 0.12 g/min/g, however, massive calcite crystals are formed with higher wire abrasion.

Causticization reaction should be carried out at a reaction temperature of 30–105° C., preferably 40–90° C. Temperatures higher than 105° C. are uneconomic because a pressure-type causticization system or the like is needed over the boiling point at atmospheric pressure. However, temperatures lower than 30° C. are also unsuitable because aragonite crystals are scarcely formed and system modifications are required to cool green liquor of about 80° C., thereby adding costs.

Agitation during causticization reaction may be performed using a means appropriately selected from conventional extruders, kneaders and blenders equipped with agitating blades or a pump that are suitable for homogeneously mixing the milk of lime prepared by slaking quick lime and suspending the slaked lime with sodium carbonate (see Handbook of Chemical Engineering published by Maruzen, Mar. 18, 1988).

Under the conditions described above, acicular, columnar or radiating calcium carbonate consisting of particles having a minor axis of 0.1–1.5 μm and a major axis of 0.3–15 μm can be prepared.

As compared with calcium carbonate previously obtained via the causticization step, calcium carbonate in the form of aragonite crystals obtained by the present invention shows lower wire abrasion and can be used to produce fine-quality papers or coated papers having excellent stiffness, whiteness, opacity, smoothness, writing suitability, touch, printability or other properties. From this it can be readily inferred that it can be used in newspapers, medium papers, printing papers, book papers, bill papers, dictionary papers, double-side ground wood kraft papers, bleached kraft papers, tissue papers, rice papers, Indian papers, paper boards, non-carbon papers, art papers, light coated papers, cast coated papers, wall papers, heat-sensitive papers or the like to give them excellent properties such as stiffness, whiteness, opacity, smoothness, writing suitability, touch, printability or the like. It also can be used in various pigments to give excellent gloss, smoothness, printability, and like properties. In addition to papers, it can also be used in rubbers, plastics, paints, sealing agents, adhesives, fertilizers, etc.

EFFECTS OF THE INVENTION

Although the mechanism of the present invention is not completely understood, it is thought that aragonite crystals may readily precipitate in the reaction between quick lime/slaked lime and sodium carbonate in the presence of an alkali. However, calcite crystals are likely to be produced if carbonate ions excessively exist in the solution during this reaction. Thus, the proportion of aragonite crystals tends to be lowered if sodium carbonate is excessive during the preparation of milk of lime or if the loading rate of green liquor is increased during the reaction.

This calcium carbonate mainly has three features. Firstly, it improves plastic wire abrasion during high-speed papermaking. Secondly, it can be used as a filler to improve bulk, opacity, whiteness and stiffness. Thirdly, it improves gloss after printing and surface strength when it is ground and used as a pigment. The first feature results from the acicular primary particles with high aspect ratio and little sharp edges which are advantageous for improving abrasion because of the low frictional resistance during contact with wire. The second feature is explained by electron microscopy of the surface/section of the resulting paper, which shows that acicular calcium carbonate particles fill gaps between pulp fibers as if they are microfibers and they are stiff enough to form many minute air spaces so as to render good bulk, opacity and whiteness. The third feature results from the acicular, columnar or radiating particles of 0.3–15 μm before grinding, which renders low gloss and improved ink absorption. It is thought that printabilities such as glossiness after printing or the like are improved because the particles have a relatively homogeneous size after grinding.

The following examples illustrate the present invention as compared with comparative examples without, however, limiting the same thereto as a matter of course.

EXAMPLES

Test Methods (1) Alkalinity was determined according to TAPPI 624 hm-85, TAPPI625 hm-85 or similar methods.

(2) Average particle size of light calcium carbonate was determined with a laser diffraction-type particle size distribution analyzer (Cirrus model 715) after the product was washed with water, filtered, and diluted with water.

(3) Morphology was observed with a scanning electron microscope (JSM-5300 from JEOL Ltd.) after the product was washed with water, filtered and dried. On the basis of this observation, the minor and major axes of 30 particles were measured.

(4) Crystal structure was determined with an X-ray diffractometer RAD-2C from Rigaku.

(5) Wire abrasion was determined as follows.
Tester: Nippon Filcon wire wear tester.
Measurement conditions: slurry concentration 0.5%, flow rate 0.65 L/min, a ceramic roll having a diameter of 60 φ rotated at 1500 rpm, contact angle 111 degree, weight 1.25 kg, wire type COS60 of 40×140 mm, testing period 90 min.

$$\text{Abrasion (\%)} = \frac{[\text{Wire weight before testing (g)} - \text{Wire weight after testing (g)}]}{\text{Wire weight before testing (g)}} \times 100$$

Example 1

In a four-necked flask having a suitable capacity (the same vessel was used in the example and comparative examples below), slaked lime was mixed with a 7-fold dilution of white liquor in water (NaOH:$Na_2CO_3$:$Na_2S$=0.17:0.04:0.06 mol/l) at a quick lime concentration of 10% by weight to prepare milk of lime, which was then causticized with green liquor ($Na_2CO_3$:$Na_2S$=1.6:0.5 mol/l; the same composition as below) under the conditions of a sodium carbonate loading rate of 0.04 g (sodium carbonate)/min/g (quick lime), a temperature of 50° C. and an agitation speed of 400 rpm (using KYOEI POWER STIRRER TYPE PS-2N; the same agitator as below). The product was found to be calcium carbonate in the form of radiating aragonite crystals having an average particle size of 5.6 μm in which primary particles had an average major axis of 2.1 μm and an average minor axis of 0.3 μm. The wire abrasion was 0.2%. Experimental conditions and results are shown in Table 1.

Example 2

The procedure of Example 1 was repeated except that a 2-fold dilution of white liquor in water (NaOH:$Na_2CO_3$:$Na_2S$=0.60:0.14:0.21 mol/l) was used at a quick lime concentration of 40% by weight to prepare milk of lime, which was then causticized with green liquor under the conditions of a sodium carbonate loading rate of 0.005 g/min/g and a temperature of 90° C. The product was found to be calcium carbonate in the form of columnar aragonite crystals having an average particle size of 7.0 μm in which primary particles had an average major axis of 6.5 μm and an average minor axis of 0.6 μm. The wire abrasion was 0.1%. Experimental conditions and results are shown in Table 1.

Comparative Example 1

The procedure of Example 1 was repeated except that an aqueous 1 mol/l NaOH solution containing 0.8 mol/l $Na_2CO_3$ was used to prepare milk of lime. The reaction product was found to be spindle-like calcium carbonate having an average particle size of 3.6 μm in which primary particles had an average major axis of 2.8 μm and an average minor axis of 0.5 μm. The wire abrasion was 0.3%. Experimental conditions and results are shown in Table 1.

Comparative Example 2

The procedure of Example 2 was repeated except that the sodium carbonate loading rate was 2 g/min/g. The reaction product was found to be calcium carbonate consisting of irregular primary particles having an average particle size of 5.6 μm. The wire abrasion was 1.0%. Experimental conditions and results are shown in Table 1.

Comparative Example 3

The procedure of Example 1 was repeated except that the causticization temperature was 20° C. The reaction product was found to be calcium carbonate consisting of irregular primary particles having an average particle size of 6.2 μm. The wire abrasion was 1.3%. Experimental conditions and results are shown in Table 1.

TABLE 1

|  | Examples | | Comparative examples | | |
| --- | --- | --- | --- | --- | --- |
|  | 1 | 2 | 1 | 2 | 3 |
| Concentration of milk of lime (%) | 10 | 40 | 10 | 10 | 10 |
| Composition of slaking/dispersing solvent |  |  |  |  |  |
| NaOH (mol/L) | 0.17 | 0.60 | 1.00 | 0.17 | 1.00 |
| $Na_2CO_3$ (mol/L) | 0.04 | 0.14 | 0.80 | 0.04 | 0.00 |
| $Na_2S$ (mol/L) | 0.06 | 0.21 | 0.00 | 0.06 | 0.00 |
| Sodium carbonate source | green liquor | green liquor | green liquor | green liquor | green liquor |
| Sodium carbonate loading rate (g as $Na_2CO_3$/min/g as CaO) | 0.04 | 0.005 | 0.002 | 2 | 0.002 |
| Temperature (° C.) | 50 | 90 | 50 | 50 | 20 |
| Particle shape | radiating | columnar | spindle-like | massive | massive |
| Average particle size (μm) | 5.6 | 7.0 | 3.6 | 5.6 | 6.2 |
| Major axis (μm) | 2.1 | 6.5 | 2.8 | — | — |
| Minor axis (μm) | 0.3 | 0.6 | 0.5 | — | — |
| Wire abrasion (%) | 0.2 | 0.1 | 0.3 | 1.0 | 1.3 |
| Crystal structure | aragonite | aragonite | calcite | calcite | calcite |

As shown in Examples 1 to 2, calcium carbonates according to the present invention were in the form of acicular, columnar or radiating aragonite crystals. They showed lower plastic wire abrasion. Moreover, processes of the present invention are able to greatly reduce production costs because these calcium carbonates could be prepared by taking advantage of the conventional causticization step. According to the present invention, the loading period of green liquor can also be reduced and aragonite can be prepared even at low concentrations of milk of lime to increase the content of aragonite in the resulting calcium carbonate. In addition, the use of diluted white liquor for the preparation of milk of lime reduces the amount of water used to prepare milk of lime as compared with the process disclosed in JPA 226974/98, thus limiting any loss in alkali concentration in white liquor after the causticization step.

The invention claimed is:

1. A process for producing calcium carbonate in the form of aragonite crystals which is useful as a filler for papermaking via the causticization step of the sulfate or soda pulping process, which process comprises
   (1) adding an aqueous alkaline solution having a pH higher than 13.5, a hydroxide ion level of 3 mol/l or less and containing 0.1 mol/mol (carbonate ion/quick lime) or less of carbonate ion to quick lime and/or slaked lime, until the concentration of the quick lime reaches 1–60% by weight with stirring to prepare milk of lime, and then
   (2) adding green liquor to said milk of lime at a loading rate of 0.002–0.04 g (sodium carbonate)/min/g (quick lime) to perform a causticization reaction at a temperature of 30–105° C.

2. The process of claim 1 wherein the causticization reaction is effected at a temperature from 40 to 90° C.

3. The process of claim 1 wherein the aqueous alkaline solution comprises a weak liquor.

* * * * *